(12) United States Patent
Hu et al.

(10) Patent No.: US 10,339,428 B2
(45) Date of Patent: Jul. 2, 2019

(54) INTELLIGENT SCORING METHOD AND SYSTEM FOR TEXT OBJECTIVE QUESTION

(71) Applicant: IFLYTEK CO., LTD., Hefei, Anhui Province (CN)

(72) Inventors: Yulong Hu, Anhui (CN); Yintian Zhang, Anhui (CN); Bo Zhu, Anhui (CN); Si Wei, Anhui (CN); Guoping Hu, Anhui (CN); Yu Hu, Anhui (CN); Qingfeng Liu, Anhui (CN)

(73) Assignee: IFLYTEK CO., LTD., Hefei (CN)

( * ) Notice: Subject to any disclaimer, the term of this patent is extended or adjusted under 35 U.S.C. 154(b) by 103 days.

(21) Appl. No.: 15/511,541

(22) PCT Filed: Aug. 11, 2015

(86) PCT No.: PCT/CN2015/086585
§ 371 (c)(1),
(2) Date: Mar. 15, 2017

(87) PCT Pub. No.: WO2016/041423
PCT Pub. Date: Mar. 24, 2016

(65) Prior Publication Data
US 2017/0262738 A1 Sep. 14, 2017

(30) Foreign Application Priority Data

Sep. 16, 2014 (CN) .......................... 2014 1 0472818

(51) Int. Cl.
*G06K 9/34* (2006.01)
*G06K 9/68* (2006.01)
*G06K 9/72* (2006.01)

(52) U.S. Cl.
CPC .......... *G06K 9/6878* (2013.01); *G06K 9/342* (2013.01); *G06K 9/6807* (2013.01); *G06K 9/72* (2013.01);
(Continued)

(58) Field of Classification Search
CPC ...... G06K 9/6878; G06K 9/6807; G06K 9/72; G06K 9/342; G06K 2209/01; G06K 2209/013
See application file for complete search history.

(56) References Cited

U.S. PATENT DOCUMENTS 3,643,069 A 2/1972 Kikuchi
4,731,861 A 3/1988 Blanton et al.
(Continued)

FOREIGN PATENT DOCUMENTS

CN 1822630 8/2006
CN 101866415 10/2010
(Continued)

OTHER PUBLICATIONS

El-Yacoubi, A., et al "An HMM-based approach for off-line unconstrained handwritten word modeling and recognition." IEEE Transactions on Pattern Analysis and Machine Intelligence 21.8 (1999): 752-760 (Year: 1999).*
(Continued)

Primary Examiner — Menatoallah Youssef
(74) Attorney, Agent, or Firm — Zhong Law, LLC

(57) ABSTRACT

An intelligent scoring method and system for a text objective question, the method comprising: acquiring an answer image of a text objective question (101); segmenting the answer image to obtain one or more segmentation results of an answer string to be identified (102); determining whether any of the segmentation results has the same number of characters as the standard answer (103); if no, the answer is determined to be wrong (106); otherwise, calculating identification confidence of the segmentation result having the same number of words as the standard answer, and/or calculating the identification confidence of respective characters in the segmentation result having the same number of words as the standard answer (104); determining whether
(Continued)

the answer is correct according to the calculated identification confidence (105). The method can automatically score text objective questions, thus reducing consumption of human resource, and improving scoring efficiency and accuracy.

16 Claims, 10 Drawing Sheets

(52) U.S. Cl.
CPC ... *G06K 2209/01* (2013.01); *G06K 2209/013* (2013.01)

(56) References Cited

U.S. PATENT DOCUMENTS

| | | | | |
|---|---|---|---|---|
| 2002/0176598 | A1* | 11/2002 | Knowles | G06Q 10/10 |
| | | | | 382/100 |
| 2006/0160054 | A1 | 7/2006 | Onishi et al. | |
| 2006/0252023 | A1 | 11/2006 | Cui | |
| 2007/0031802 | A1* | 2/2007 | Koyama | G09B 7/02 |
| | | | | 434/323 |
| 2007/0048718 | A1* | 3/2007 | Gruenstein | G09B 7/06 |
| | | | | 434/322 |
| 2011/0158548 | A1 | 6/2011 | Aizawa | |
| 2015/0302243 | A1* | 10/2015 | Gross | G06K 9/00456 |
| | | | | 382/224 |

FOREIGN PATENT DOCUMENTS

| | | |
|---|---|---|
| CN | 102890775 | 1/2013 |
| CN | 102890775 A | 1/2013 |
| CN | 103324929 | 9/2013 |
| CN | 103559490 | 2/2014 |
| CN | 104268603 | 1/2015 |
| JP | H06-124364 A | 5/1994 |
| JP | H10-302025 A | 11/1998 |
| JP | H11-328316 A | 11/1999 |
| JP | 2001-154573 A | 6/2001 |
| JP | 2001-283157 A | 10/2001 |
| JP | 2009-276709 A | 11/2009 |
| JP | 2012-098905 A | 5/2012 |

OTHER PUBLICATIONS

Japanese Office Action received in JP2017-515834 dated May 9, 2018, pp. 33.
Korean Office Action received in KR10-2017-7006871 dated Dec. 14, 2017, pp. 13.
International Search Report for International Application No. PCT/CN2015/086585, dated Oct. 16, 2015, 6 pages.
SIPO P.R.China, First Office Action for Application No. 201410472818.3, 8 pages (Machine Translation).

* cited by examiner

Perform fine segmentation on the answer image to obtain a plurality of fine segmentation sub-blocks
301

Combine the fine segmentation sub-blocks and calculate combination confidence
302

Determine combination results according to the confidence, and obtain one or more segmentation results of an answer string to be identified 303

*Fig. 3*

INTELLIGENT SCORING METHOD AND SYSTEM FOR TEXT OBJECTIVE QUESTION

CROSS-REFERENCE TO RELATED APLLICATIONS

This application is a US National Stage application of International Application No. PCT/CN2015/086585 filed Aug. 11, 2015, and based on China Patent Application No. 201410472818.3 filed on Sep. 16, 2014, the contents of which are incorporated herein by reference in their entirety.

FIELD OF THE DISCLOSURE

The present disclosure relates to the field of information processing technologies, and specifically relates to an intelligent scoring method and system for a text objective question.

Description of the Related Art

As computer technologies and education informatization continuously advance, computer and artificial intelligence technologies have been gradually applied in a variety of daily teaching activities, including those for real scenarios such as teaching assistance and teaching evaluation. The main form currently used in China to evaluate situations of basic education and student studying is still various examinations or tests. In such a circumstance, teachers are under tremendous work pressure to check homework and score examination papers. In light of this, all kinds of automatic scoring systems have been gradually promoted and adopted in medium-, large-scale or important examinations or tests, and this type of system could reduce, to a certain degree, the examination paper scoring workload for teachers.

In existing automatic scoring systems, however, portions that are completely scored by a computer are mostly objective questions with a space to be filled (e.g. multiple choice questions). While for text objective questions like text completion questions, it is still necessary to gather a large number of teachers for scoring. For a large-scale examination, moreover, centralized training and testing need to be offered to the scoring teachers before scoring the examination papers. As a result, a conventional automatic scoring system still consumes significant human resources, and moreover, it is possible for unfair, unjust situations to occur in the scoring results due to subjective factors, such as style, moods, and mental status of different teachers, during the scoring process.

SUMMARY OF THE DISCLOSURE

Embodiments of the present disclosure provide an intelligent scoring method and system for a text objective question, so as to achieve automatic scoring of text objective questions, thereby reducing consumption of human resources and improving scoring efficiency and accuracy.

To this end, embodiments of the present disclosure provide the following technical solution:

Embodiments of the present disclosure provide an intelligent scoring method for a text objective question, comprising:

acquiring an answer image of a text objective question;
segmenting the answer image to obtain one or more segmentation results of an answer string to be identified;

determining whether any of the segmentation results has the same number of characters as that of the standard answer;

if not, determining that the answer is incorrect;

otherwise, calculating identification confidence of the segmentation result having the same number of characters as that of the standard answer, and/or calculating the identification confidence of each character in the segmentation result having the same number of characters as that of the standard answer;

determining whether the answer is correct according to the calculated identification confidence.

Preferably, said acquiring an answer image of a text objective question comprises:

acquiring an image of an answer sheet;

according to the layout information of the answer sheet, segmenting and extracting a target answer region of the answer sheet image;

extracting an answer image of a text objective question from the target answer region.

Preferably, said acquiring an image of an answer sheet comprises:

using an optical mark reader, a high-speed portable scanner, or a mobile terminal device to acquire an image of an answer sheet.

Preferably, said segmenting the answer image to obtain one or more segmentation results of an answer string to be identified comprises:

performing fine segmentation on the answer image to obtain a plurality of fine segmentation sub-blocks;

combining the fine segmentation sub-blocks and calculating combination confidence;

determining combination results according to the confidence, and obtaining one or more segmentation results of an answer string to be identified.

Preferably, said calculating combination confidence comprises:

extracting a character feature of the character obtained from the combination;

using a rule statistical model obtained from pre-training and the character feature to calculate confidence of said combination.

Preferably, said calculating identification confidence of the segmentation result having the same number of characters as that of the standard answer comprises:

aligning the segmentation result having the same number of characters as that of the standard answer with the text string of the standard answer;

on the basis of an acoustical model of a complete character set and a general language model, performing handwriting decoding and identification on the segmentation result having the same number of characters as that of the standard answer, to obtain a likelihood score of each identification result;

selecting a likelihood score of a path with a decoding path consistent with the standard answer in an identification result;

calculating a posteriori score of said path, and using the posteriori score as the identification confidence of the segmentation result having the same number of characters as that of the standard answer;

correspondingly, said determining whether the answer is correct according to the calculated identification confidence comprises:

if there is any segmentation result having the same number of characters as that of the standard answer having an identification confidence greater than a first confidence threshold, determining that the answer is correct; otherwise, determining that the answer is incorrect.

Preferably, said calculating identification confidence of each character in the segmentation result having the same number of characters as that of the standard answer comprises:

aligning the segmentation result having the same number of characters as that of the standard answer with the text string of the standard answer;

on the basis of an acoustical model of a complete character set, calculating a likelihood score of the identification result of each character in the segmentation result having the same number of characters as that of the standard answer;

selecting a likelihood score of the identification result of the character that is consistent with the standard answer in the identification results;

calculating a posteriori score of the selected identification result, and using the posteriori score as the identification confidence of the character;

correspondingly, said determining whether the answer is correct according to the calculated identification confidence comprises:

if the identification confidence is greater than a second confidence threshold for all characters in any segmentation result having the same number of characters as that of the standard answer, determining that the answer is correct; otherwise, determining that the answer is incorrect.

Preferably, said calculating identification confidence of each character in the segmentation result having the same number of characters as that of the standard answer comprises:

aligning the segmentation result having the same number of characters as that of the standard answer with the text string of the standard answer;

on the basis of an acoustical model of a complete character set and a general language model, performing handwriting decoding and identification on the segmentation result having the same number of characters as that of the standard answer, to obtain a likelihood score of each identification result;

calculating a posteriori probability of each identification result, and, according to the posteriori probability of each identification result and for each character in the segmentation result, accumulating the posteriori probability that the identification result of said character in each identification result is consistent with the standard answer, and using the posteriori score as the confidence of the character;

correspondingly, said determining whether the answer is correct according to the calculated identification confidence comprises:

if the identification confidence is greater than a third confidence threshold for all characters in any segmentation result having the same number of characters as that of the standard answer, determining that the answer is correct; otherwise, determining that the answer is incorrect.

Embodiments of the present disclosure further provide an intelligent scoring system for a text objective question, comprising: an image acquisition module, a segmentation module, a first determination module, a calculation module, a second determination module, and an output module, wherein:

said image acquisition module is configured to acquire an answer image of a text objective question;

said segmentation module is configured to segment the answer image to obtain one or more segmentation results of an answer string to be identified;

said first determination acquisition module is configured to determine whether any of the segmentation results obtained by said segmentation module has the same number of characters as that of the standard answer, and when the determination result is that there is no segmentation result having the same number of characters as that of the standard answer, trigger said output module to output a prompt message that the answer is incorrect; otherwise, trigger said calculation module to calculate identification confidence;

said calculation module comprises a first calculation module and/or a second calculation module; said first calculation module is configured to calculate identification confidence of the segmentation result having the same number of characters as that of the standard answer, and said second calculation module is configured to calculate the identification confidence of each character in the segmentation result having the same number of characters as that of the standard answer;

said second determination module is configured to determine whether the answer is correct according to the identification confidence calculated by said calculation module, and when it is determined that the answer is correct, trigger said output module to output a prompt message that the answer is correct; when it is determined that the answer is incorrect, trigger said output module to output a prompt message that the answer is incorrect.

Preferably, said image acquisition module comprises:

an image acquisition unit configured to acquire an image of an answer sheet;

an answer region extraction unit configured to, according to the layout information of the answer sheet, segment and extract a target answer region of the answer sheet image;

an answer content extraction unit configured to extract an answer image of a text objective question from the target answer region.

Preferably, said image acquisition unit is specifically an optical mark reader, a high-speed portable scanner, or a mobile terminal device.

Preferably, said segmentation module comprises:

a segmentation unit configured to perform fine segmentation on the answer image to obtain a plurality of fine segmentation sub-blocks;

a confidence calculation unit configured to combine the fine segmentation sub-blocks and calculate combination confidence;

a combination result determination unit configured to determine combination results according to the confidence, and obtain one or more segmentation results of an answer string to be identified.

Preferably, said confidence calculation unit comprises:

a combination subunit configured to combine the fine segmentation sub-blocks;

an extraction subunit configured to extract a character feature of the character obtained from the combination;

a calculation subunit configured to use a rule statistical model obtained from pre-training and the character feature to calculate confidence of said combination.

Preferably, said first calculation module comprises:

an alignment unit configured to align the segmentation result having the same number of characters as that of the standard answer with the text string of the standard answer;

a first identification unit configured to, on the basis of an acoustical model of a complete character set and a general language model, perform handwriting decoding and identification on the segmentation result having the same number of characters as that of the standard answer, to obtain a likelihood score of each identification result;

a first selection unit configured to select a likelihood score of a path with a decoding path consistent with the standard answer in an identification result;

a first calculation unit configured to calculate a posteriori score of said path, and use the posteriori score as the identification confidence of the segmentation result;

said second determination module is specifically configured to, if there is any segmentation result having the same number of characters as that of the standard answer having an identification confidence greater than a first confidence threshold, determine that the answer is correct; otherwise, determine that the answer is incorrect.

Preferably, said second calculation module comprises:

an alignment unit configured to align the segmentation result having the same number of characters as that of the standard answer with the text string of the standard answer;

a second identification unit configured to, on the basis of an acoustical model of a complete character set, calculate a likelihood score of the identification result of each character in the segmentation result having the same number of characters as that of the standard answer;

a second selection unit configured to select a likelihood score of the identification result of the character that is consistent with the standard answer in the identification results;

a second calculation unit configured to calculate a posteriori score of the selected identification result, and use the posteriori score as the identification confidence of the character;

said second determination module is specifically configured to, if the identification confidence is greater than a second confidence threshold for all characters in any segmentation result having the same number of characters as that of the standard answer, determine that the answer is correct; otherwise, determine that the answer is incorrect.

Preferably, said second calculation module comprises:

the alignment unit configured to align the segmentation result having the same number of characters as that of the standard answer with the text string of the standard answer;

the first identification unit configured to, on the basis of an acoustical model of a complete character set and a general language model, perform handwriting decoding and identification on the segmentation result having the same number of characters as that of the standard answer, to obtain a likelihood score of each identification result;

a third calculation unit configured to calculate a posteriori probability of each identification result, and, according to the posteriori probability of each identification result and for each character in the segmentation result having the same number of characters as that of the standard answer, accumulate the posteriori probability that the identification result of said character in each identification result is consistent with the standard answer, and use the posteriori score as the confidence of the character;

said second determination module is specifically configured to, if the identification confidence is greater than a third confidence threshold for all characters in any segmentation result having the same number of characters as that of the standard answer, determine that the answer is correct; otherwise, determine that the answer is incorrect.

The intelligent scoring method and system for a text objective question provided in the embodiments of the present disclosure perform identification of handwritten character strings for a text objective question with a known standard answer by using the priori information of the answer, thereby achieving automatic scoring of the text objective question, and solving the problem that the conventional automatic scoring system is incapable of using computers to fully automatically score text objective questions, and then rely on manual scoring which results in significant consumption of human resources, high working pressure on teachers and inaccurate scoring results due to subjectivities of the scoring teachers.

BRIEF DESCRIPTION OF THE DRAWINGS

To further clarify embodiments of the present application or existing solutions, the following sections briefly introduce the accompanying drawings to be used in the embodiments. Apparently, the accompanying drawings in the description below are only some embodiments recorded in the present disclosure, and to a person skilled in the art, other drawings may be derived based on these accompanying drawings.

FIG. 3 is a flow chart of segmenting an answer image in an embodiment of the present disclosure;

DETAILED DESCRIPTION OF THE DISCLOSURE

To allow a person skilled in the art better understand solutions, the embodiments of the present disclosure will be further described in detail below with reference to the accompanying drawings and implementation modes.

In one embodiment, the intelligent scoring method and system for a text objective question may identify handwritten character strings for an examination paper with text questions having standard answers (e.g., an examination paper including text completion questions) by using the priori information of the standard answers, thereby achieving automatic scoring of the text objective questions.

Figure 1:
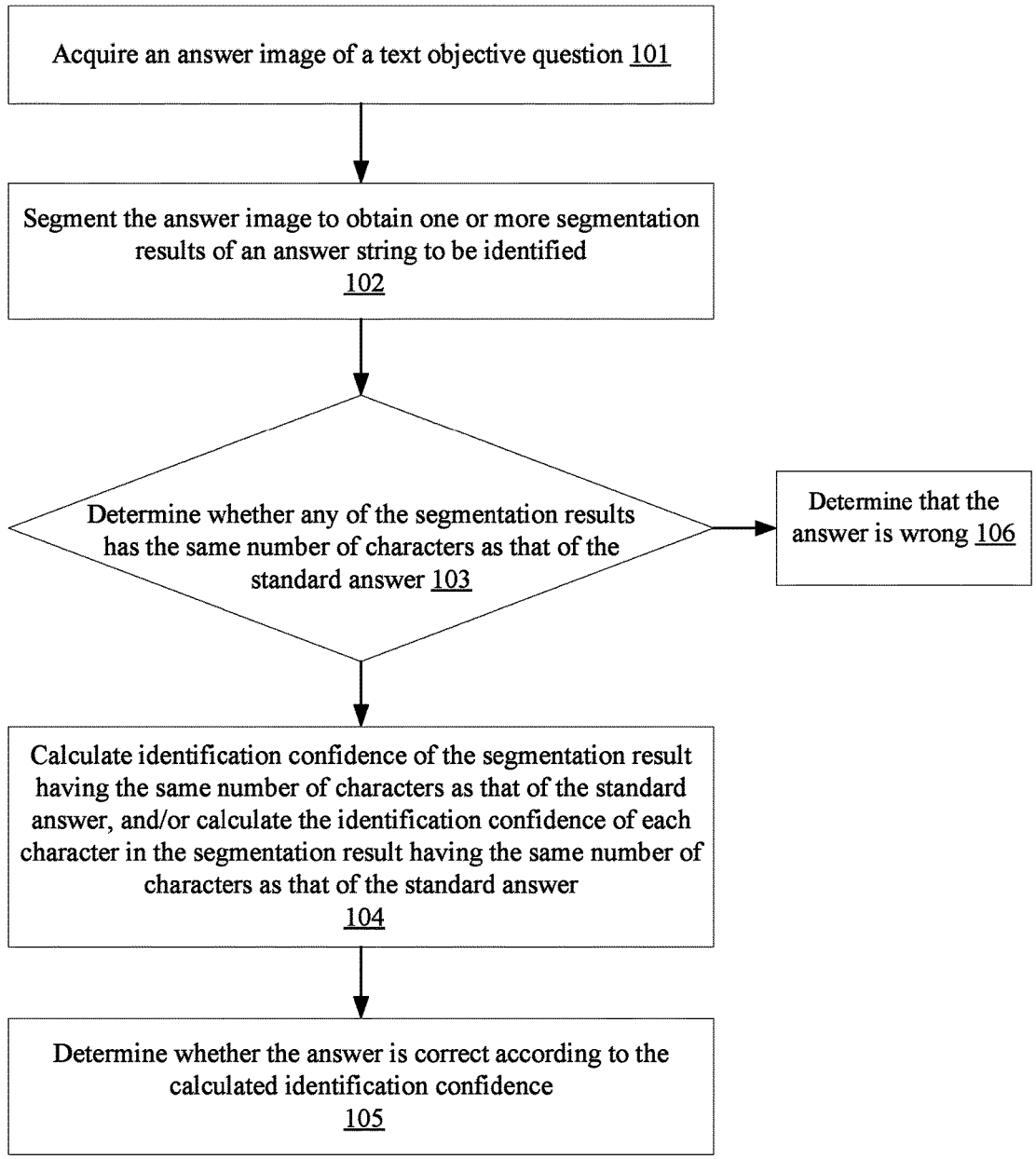
FIG. 1 is a flow chart of an intelligent scoring method for a text objective question in an embodiment of the present disclosure.

FIG. 1 is a flow chart of an intelligent scoring method for grading a text objective question in an embodiment of the present disclosure, the method comprising the following steps:

Step 101, acquiring an answer image of a text objective question.

Said answer image of the text objective question may include an image of an answer character string, and in the embodiments of the present disclosure, said answer character string may be a Chinese character string, an English character string, etc.

The specific process to acquire an answer image is as follows:

(1) to acquire an image of an answer sheet.

An optical mark reader may be used to scan and acquire an image of an answer sheet. Alternatively, a device, such as a high-speed portable scanner or a mobile terminal, may be used to take photos to acquire the image of the answer sheet.

(2) According to the layout information of the answer sheet, to segment and extract a target answer region in the answer sheet image.

In practice, prior to segmenting and extracting a target answer region, the answer sheet image may be pre-processed to extract an accurate target answer region. Said pre-processing may comprise performing operations, such as positioning, calibration, noise reduction, contrast enhancement, and conversion from colors to grey levels, on the answer sheet image, and the specific processing method is the same as the pre-processing method for answer sheet images in an existing automatic scoring system, which will not be repeated herein.

The layout information of the answer sheet is known priori information. If it is necessary to position the answer sheet image, positioning information of the answer sheet image may be further acquired. According to the information and through edge detection, the target answer region can be accurately segmented and extracted.

(3) to extract an answer image of a text objective question from the target answer region.

When the target answer region is obtained, according to the layout information of the answer sheet and through edge detection, an answer image can be obtained, and the answer image is an image of the answer character string.

Step 102, segmenting the answer image to obtain one or more segmentation results of an answer string to be identified.

The specific segmenting process will be described in detail later.

In addition, it should be noted that, in practice, prior to segmenting the answer image, the answer image may be pre-processed to obtain more accurate segmentation results. Said pre-processing may comprise: performing binarization on the answer image, correcting inclined handwriting, thinning handwriting, etc.

Step 103, determining whether any of the segmentation results has the same number of characters as that of the standard answer. If yes, go to Step 104; otherwise, go to Step 106.

Since there will be a number of different combination results, segmentation results obtained in Step 102 may include different numbers of characters, while the segmentation result having the same number of characters as that of the standard answer is the answer that is most likely correct. Since the solution of the present disclosure is for text objective questions having standard answers, it can be determined that an answer is incorrect if its number of characters is different from that of the standard answer. If a segmentation result has the same number of characters as that of the standard answer, then it is necessary to further determine if said answer is correct.

Step 104, calculating identification confidence of the segmentation result having the same number of characters as that of the standard answer, and/or calculate the identification confidence of each character in the segmentation result having the same number of characters as that of the standard answer.

Step 105, determining whether the answer is correct according to the calculated identification confidence.

There may be a variety of ways to calculate identification confidence, and accordingly, corresponding determination can be made regarding whether the answer is correct according to identification confidence obtained through different ways of calculation, which will be specifically described in detail below.

Step 106, determining that the answer is incorrect.

In one embodiment, the intelligent scoring method for a text objective question may identify handwritten character strings for a text objective question with a known standard answer by using the priori information of the answer, thereby achieving automatic scoring of the text objective question. Embodiments solve the problem that a conventional system is unable to use computers for fully automatic scoring of text objective questions and relies on manual scoring which causes significant consumption of human resources, high working pressure on teachers and inaccurate scoring results due to subjectivities of teachers.

FIG. 3 is a flow chart of segmenting an answer image in an embodiment of the present disclosure, which comprises the following steps:

Step 301, performing fine segmentation on the answer image to obtain a plurality of fine segmentation sub-blocks.

Figure 2:
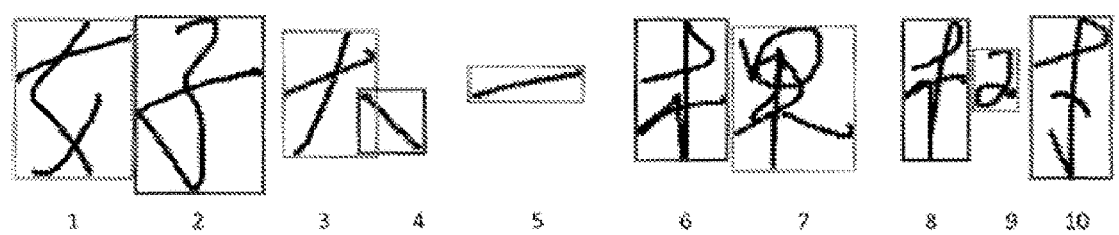
FIG. 2 is an example of segmenting an answer image in an embodiment of the present disclosure.

For example, start an 8-neighborhood black expansion from the black pixel at the most upper left corner of the answer image, such that the entire image is divided into several connected sub-regions formed by black pixels. An example of segmentation is shown in FIG. 2, and it can be seen that the original image of a character string is segmented into several segments after segmentation of connected regions is performed on the black handwriting part, where all of these segments are parts that form individual characters, which may be radicals or may be a single handwriting portion depending on the way of writing, and these segments can be combined to form different characters.

Step 302, combining the fine segmentation sub-blocks and calculate combination confidence.

For example, exhaustive combination may be performed on the fine segmentation sub-blocks, namely all fine segmentation sub-blocks that have the possibility of combination are combined one by one (e.g., for 5 fine segmentation sub-blocks). There are several combinations as follows:

(1) assuming that there is one character, then combine the fine segmentation sub-blocks 1, 2, 3, 4, and 5;

(2) assuming that there are two characters, then combine the fine segmentation sub-blocks 1, 2, 3, and 4; combine the fine segmentation sub-blocks 1, 2, and 3, and combine the fine segmentation sub-blocks 4 and 5; combine the fine segmentation sub-blocks 1 and 2, and combine the fine segmentation sub-blocks 3, 4, and 5; combine the fine segmentation sub-blocks 2, 3, 4, and 5.

The same operation is performed in this way until it is assumed that there are five characters.

Said combination confidence represents the accuracy of characters obtained from combination, and specifically, features such as height, width, height/width ratio, inter-character distance, and intra-character distance of the characters after combination can be extracted, a likelihood score can be obtained according to a rule-based statistical model pre-trained for the system, and said score is used as the confidence of a current combination result.

Said rule-based statistical model is a statistical model trained according to the extracted features such as height, width, height/width ratio, inter-character distance, and intra-character distance of the characters after the training data are segmented, and said model may be GMM (Gaussian Mixture Model) or SVM (Support Vector Machine).

The calculation of combination confidence includes to calculate a likelihood score calculated using the rule-based statistical model with the features extracted from the combination result, to combine the scores, and to determine the combination confidence according to said score, or directly use said score as a corresponding combination confidence.

Step 303, determining combination results according to the confidence, and obtain one or more segmentation results of an answer string to be identified.

Specifically, if the confidence is greater than a predetermined threshold, it is concluded that said combination is credible, otherwise it is concluded that said combination is not credible. Subsequently, one or more answer character strings to be identified are obtained according to the credible combination results.

It should be noted that, in practice, prior to combination or during determining combination confidence, some determination rules may be further set based on experience or experiments (e.g., the handwriting of one Chinese character does not have more than 3 fine segmentation sub-blocks) so as to further assist or guide the completion of determination whether segmentation results of a character string are correct, and improve the accuracy of determination.

In some embodiments of the present disclosure, it may need to calculate identification confidence of each segmentation result having the same number of characters as that of the standard answer, and/or calculate the identification confidence of each character in each segmentation result having the same number of characters as that of the standard answer, and determine whether the answer is correct according to the calculated identification confidence. In practice, there may be a variety of ways of calculation and determination, which is described below, respectively.

Figure 4:
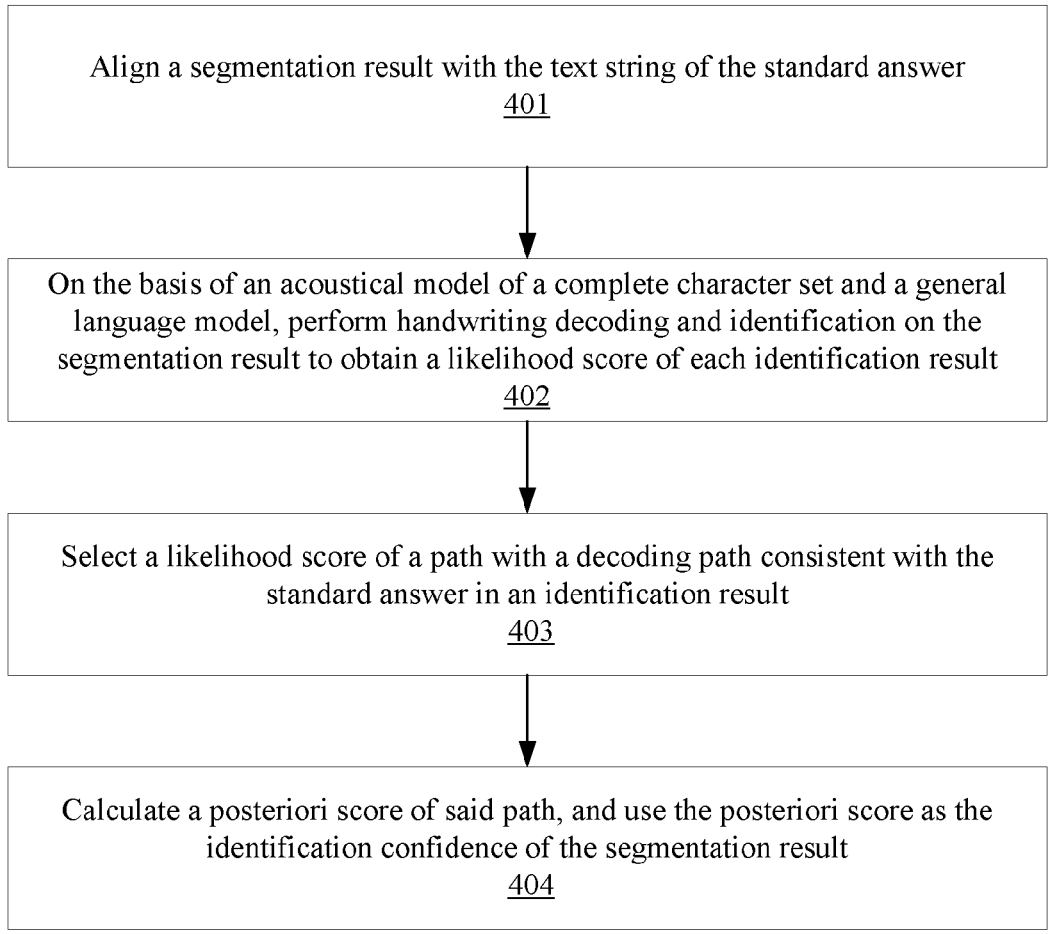
FIG. 4 is a flow chart of calculating identification confidence in an embodiment of the present disclosure.

FIG. 4 is a flow chart of calculating identification confidence in an embodiment of the present disclosure. In said embodiment, it is necessary to calculate identification likelihood score of each segmentation result, and then calculate identification confidence of said segmentation result according to said identification likelihood score.

The specific process of calculating identification confidence of each segmentation result having the same number of characters as that of the standard answer comprises the following steps:

Step 401, aligning a segmentation result with the text string of the standard answer.

In other words, align each segment in the segmentation result sequentially with each character in the text string of the standard answer one by one, and each segment in the segment sequence represents a character.

Step 402, based on an acoustical model of a complete character set and a general language model, performing handwriting decoding and identification on the segmentation result to obtain a likelihood score of each identification result.

The language model may an N-Gram model with a specific calculation equation as follows:

$$p(X, W_k) = \prod_{i=1}^{M} p(x_i | w_{ki}) p(w_{ki} | h_1^{i-1}), k = 1, 2, \ldots, K \quad (1)$$

where, $p(X, W_k)$ represents a likelihood score of the $k^{th}$ identification result of the entire sentence X of the segmentation result; M is the total number of segments in the segmentation result; K is the number of identification results of the entire sentence; $p(x_i|w_{ki})$ represents a likelihood score that the $i^{th}$ segment $x_i$ is identified as the $i^{th}$ character $w_{ki}$ in a path $W_k$; $p(w_{ki}|h_1^{i-1})$ represents priori that the given 1 to i-1 identification results are identified as $w_{ki}$.

Step 403, selecting a likelihood score of a path with a decoding path consistent with the standard answer in an identification result.

Step 404, calculating a posteriori score of said path, and use the posteriori score as the identification confidence of the segmentation result.

Specifically, first selecting a likelihood score of a path with an identification decoding path consistent with the standard answer, and then calculating identification confidence of the entire sentence of the segmentation result with the calculation equation as follows:

$$p(W_y | X) = \frac{\prod_{i=1}^{M} p(x_i | w_p) p(w_{yi} | h_1^{i-1})}{\sum_{k=1}^{K} \prod_{i=1}^{M} p(x_i | w_{ki}) p(w_{ki} | h_1^{i-1})}, k = 1, 2, \ldots, K \quad (2)$$

where, $W_y$ represents an identification decoding path consistent with the standard answer, $p(x_i|w_{yi})$ represents a likelihood score that the $i^{th}$ segment $x_i$ is identified as the $i^{th}$ character $w_{ki}$ in a path $W_y$ consistent with the standard answer; $p(w_{yi}|h_1^{i-1})$ represents priori that the given 1 to i-1 identification results are identified as $w_{yi}$ consistent with the standard answer; the value of K may be the number of all identification results. Furthermore, to reduce the amount of calculation, a relatively small value, e.g. 50, may be properly selected for K, and the selection of said value may be determined according to experience or experimental results.

Correspondingly, after identification confidence of each segmentation result is obtained using the above method, ascertain whether the answer is correct as follows: if there is any segmentation result having an identification confidence greater than a first confidence threshold, it is determined that the answer is correct; otherwise, it is determined that the answer is incorrect.

For example, the standard answer text is "黄河入海流," with respect to the segmentation results of the string to be identified, an acoustical model and a language model are used to perform handwriting decoding and identification thereon. Assume that 3 identification results are obtained, which are "黄河入海流," "黄河人海流," and "黄河入洋流," respectively, and the corresponding likelihood scores thereof are 90, 54, and 36, respectively, select the likelihood score 90 of the path "黄河入海流" that has an identification decoding path consistent with the standard answer in the identification results, and calculate the posteriori score of said path to be 0.5. Determining whether the answer is correct or incorrect based on the identification confidence includes to determine whether the posteriori score of the identification result, "黄河入海流," consistent with the standard answer, is greater than a first confidence threshold.

Figure 5:
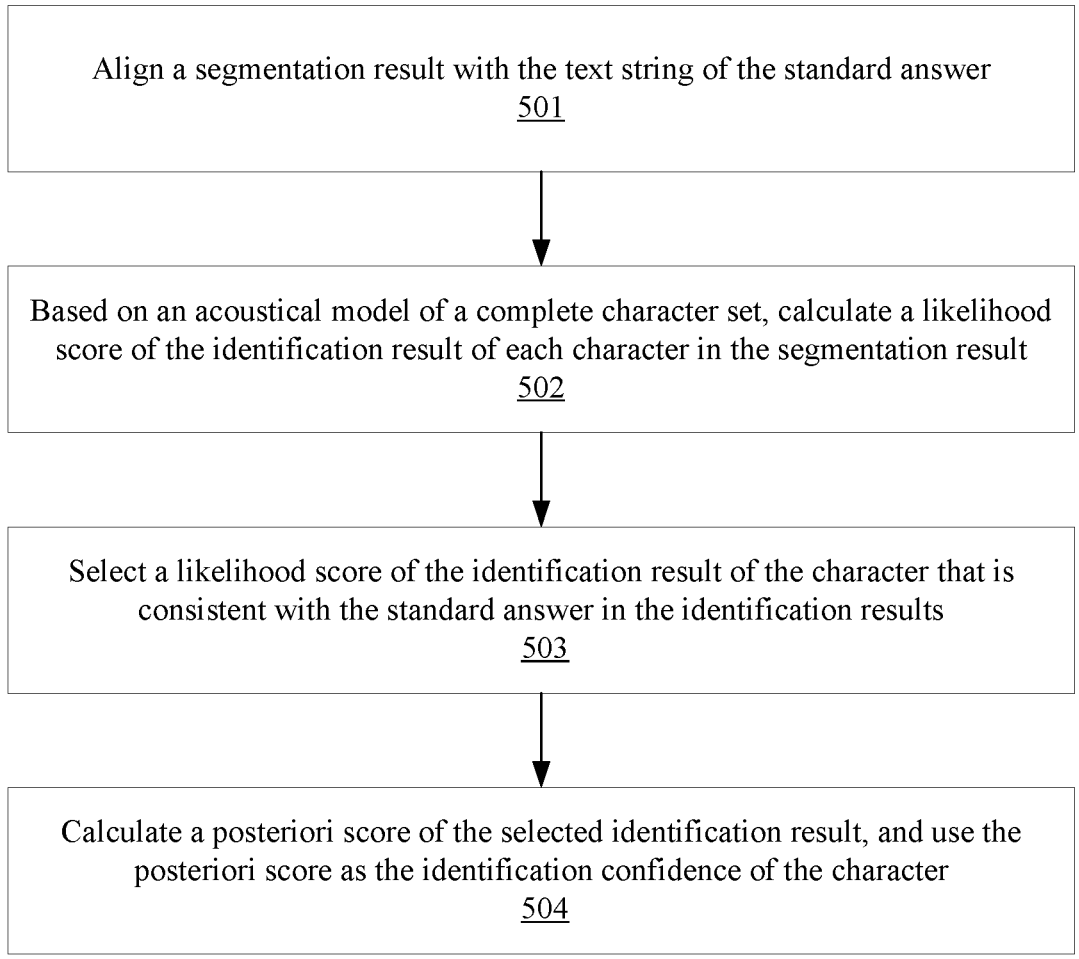
FIG. 5 is another flow chart of calculating identification confidence in an embodiment of the present disclosure.

FIG. 5 is a flow chart of calculating identification confidence in an embodiment of the present disclosure. In said embodiment, it may calculate identification confidence of each character in each segmentation result, respectively.

The specific process of calculating identification confidence of each character in each segmentation result having the same number of characters as that of the standard answer comprises the following steps:

Step 501, aligning a segmentation result with the text string of the standard answer.

In other words, align each segment (each segment represents a character) in the segmentation result sequentially with each character in the text string of the standard answer one by one. For example, the standard answer is "Shanghai," then the first segment in the segmentation result is made to correspond to "Shang," and the second segment in the segmentation result is made to correspond to "hai."

Step 502, based on an acoustical model of a complete character set, calculating a likelihood score $p(x_i|w_j)$ of the identification result of each character in the segmentation result.

where, $x_i$ represents the $i^{th}$ (i=1, 2, ..., M) segment, M is the total number of segments in the segmentation result; $w_j$ represents that the $i^{th}$ segment is identified as a $W_j$(j=1, 2, ..., N) character after an acoustical model, and N is the number of identification results.

It should be noted that, to reduce the amount of calculation in actual calculation, the value of N may be properly reduced, e.g. set to 50.

Step 503, selecting a likelihood score of the identification result of the character that is consistent with the standard answer in the identification results.

Step 504, calculating a posteriori score of the selected identification result, and use the posteriori score as the identification confidence of the character.

Specifically, select a likelihood score of an identification result consistent with the standard answer in the identification results of the segments, then calculate posteriori probability of the selected identification result, which is used as the identification confidence of the segment (i.e. character), and its calculation equation is as follows:

$$p(w_{yi}|x_i) = \frac{p(x_i|w_{yi})}{\sum_{j=1}^{N} p(x_i|w_j)} \quad (3)$$

where, $p(w_{yi}|x_i)$ represents a posteriori score that the $i^{th}$ segment $x_i$ is identified as the $i^{th}$ character $w_{yi}$ in a path $W_y$ consistent with the standard answer.

Correspondingly, based on the identification confidence of each character in each segmentation result obtained above, whether the answer is correct is determined as follows:

if the identification confidence is greater than a second confidence threshold for all characters in any segmentation result, it is determined that the answer is correct; otherwise, it is determined that the answer is incorrect.

Figure 6:
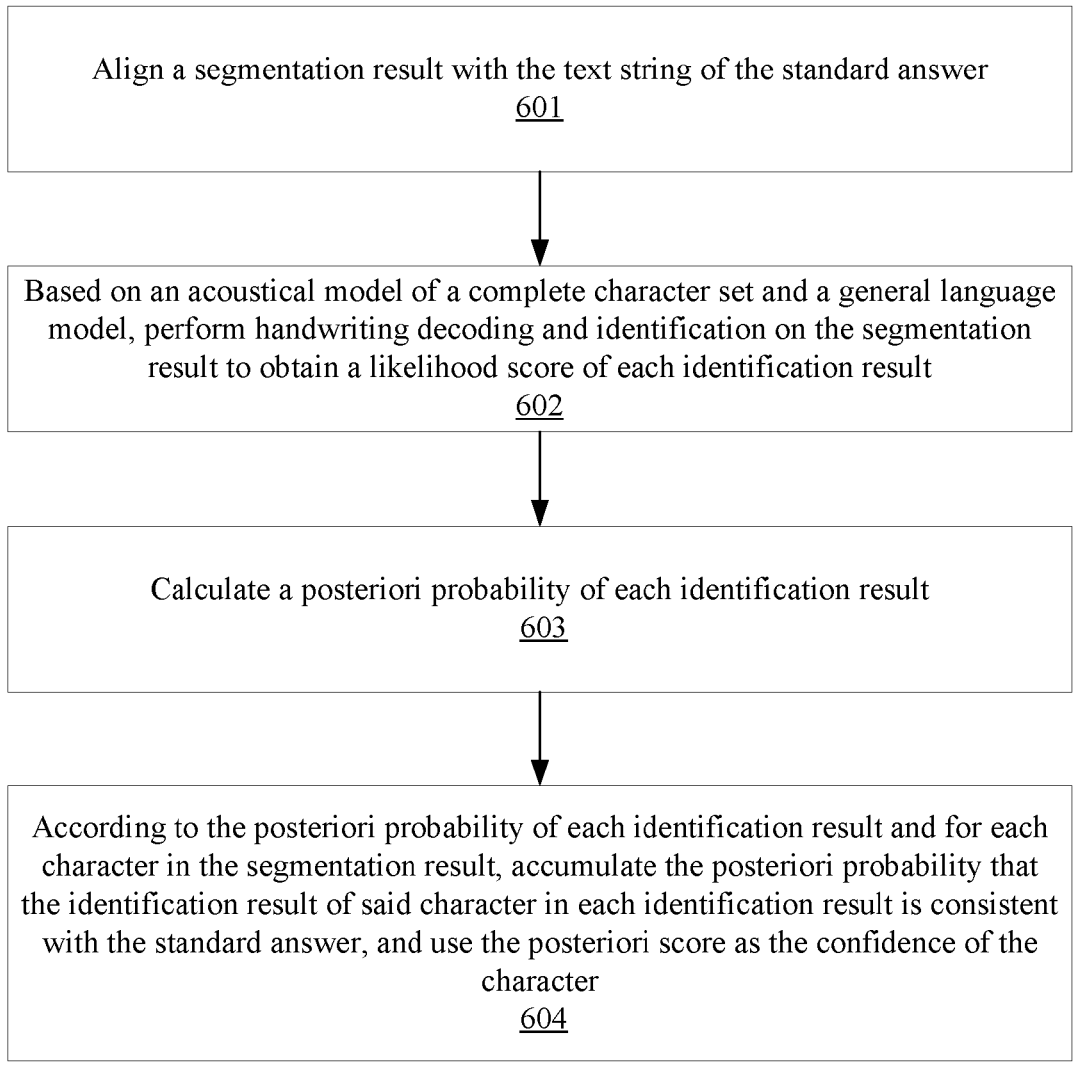
FIG. 6 is another flow chart of calculating identification confidence in an embodiment of the present disclosure.

FIG. 6 is a flow chart of calculating identification confidence in an embodiment of the present disclosure. In said embodiment, it may similarly need to calculate identification confidence of each character in each segmentation result, respectively, but the calculation method may be different from the embodiment shown in FIG. 5, and specifically comprises the following steps:

Step 601, aligning a segmentation result with the text string of the standard answer.

Step 602, based on an acoustical model of a complete character set and a general language model, performing handwriting decoding and identification on the segmentation result to obtain a likelihood score of each identification result.

See the above equation (1) for the specific calculation equation.

Step 603, calculating a posteriori probability of each identification result.

The specific calculation equation is as follows:

$$p(W_k|X) = \frac{\prod_{i=1}^{M} p(x_i|w_{ki})p(w_{ki}|h_1^{i-1})}{\sum_{k=1}^{K} \prod_{i=1}^{M} p(x_i|w_{ki})p(w_{ki}|h_1^{i-1})} \quad (4)$$

where, $p(W_k|X)$ represents posteriori probability of the $k^{th}$ identification result, and other parameters have the same meanings as those of the corresponding parameters above.

Step 604, based on the posteriori probability of each identification result and for each character in the segmentation result, accumulating the posteriori probability that the identification result of said character in each identification result is consistent with the standard answer, and using the posteriori score as the confidence of the character.

The specific calculation equation is as follows:

$$p(w_{yi}|x_i) = \sum_{w_{ji}=w_{yi}, k=1}^{K} p(W_k|X), j = 1, 2, \ldots, N \quad (5)$$

where, $p(w_{yi}|X)$ represents posteriori probability that the identification result of the character i in each identification result is consistent with the standard answer; other parameters have the same meanings as those of the corresponding parameters above. The value of K may be the total number of all identification results. Furthermore, to reduce the amount of calculation, a relatively small value, e.g. 50, may be properly selected for K, and the selection of said value may be determined based on experience or experimental results.

For example, the standard answer text is "黄河入海流," for concise description, assuming that 3 identification results are obtained through handwriting identification (i.e. K=3), and these 3 identification results are: the first identification result "黄河入海流" with a likelihood score of 0.5, the second identification result "黄河人海流" with a likelihood score of 0.3, and the third identification result "黄河入洋流" with a likelihood score of 0.2, respectively. In such a circumstance, the posteriori probability score is 0.5+0.3+0.2=1.0 for the three characters, "黄," "河," and "流," the posteriori probability score is 0.5+0.2=0.7 for "入," and the posteriori probability score is 0.5+0.3=0.8 for "海."

Correspondingly, based on the identification confidence of each character in each segmentation result obtained using the above method, whether the answer is correct is determined as follows:

if the identification confidence is greater than a third confidence threshold for all characters in any segmentation result, it is determined that the answer is correct; otherwise, it is determined that the answer is incorrect.

It should be noted that the first confidence threshold, the second confidence threshold, and the third confidence threshold mentioned above may be identical, or may be different, which is not limited by the embodiments of the present disclosure. In practice, moreover, the above three solutions may be combined arbitrarily. If two of the solutions are adopted, then whether the answer is correct may be determined depending on whether all determination conditions in these two solutions are satisfied; if they are all satisfied, then it is determined that the answer is correct; otherwise, it is determined that the answer is incorrect. If three of the solutions are adopted, then it is determined that the answer is correct if all determination conditions in these three solutions are satisfied, or if the determination conditions in any two of the solutions are satisfied; otherwise, it is determined that the answer is incorrect.

Figure 7:
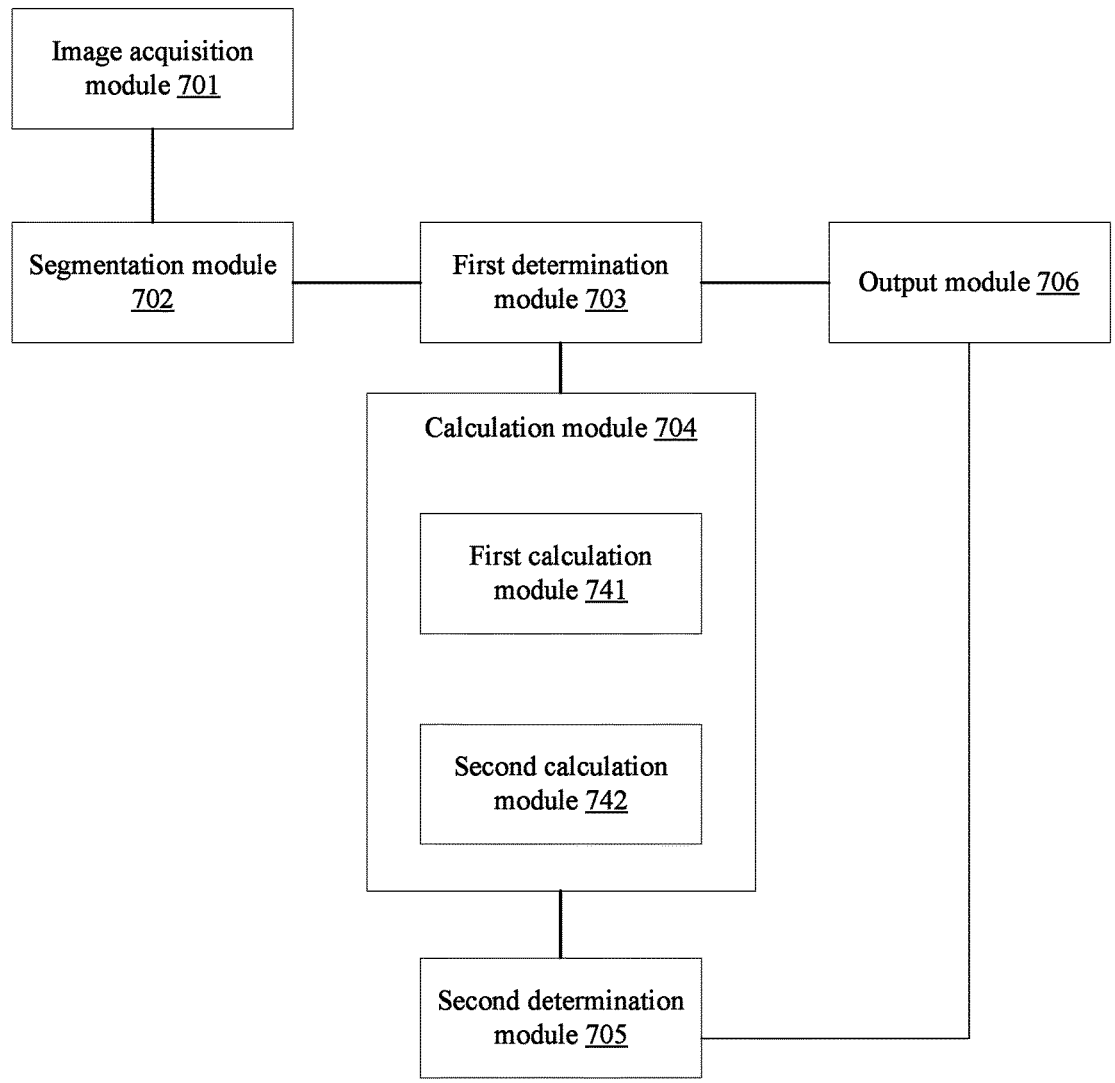
FIG. 7 is a schematic diagram of the structure of an intelligent scoring system for a text objective question in an embodiment of the present disclosure.

Correspondingly, embodiments of the present disclosure further provide an intelligent scoring system for a text objective question, as shown in FIG. 7, which is a schematic diagram of the structure of an intelligent scoring system for a text objective question in an embodiment of the present disclosure.

In said embodiment, said system comprises: an image acquisition module 701, a segmentation module 702, a first determination module 703, a calculation module 704, a second determination module 705, and an output module 706. Wherein, the calculation module 704 comprises a first calculation module 741 and a second calculation module 742.

The above image acquisition module 701 is configured to acquire an answer image of a text objective question;

The above segmentation module 702 is configured to segment the answer image that is acquired by the image acquisition module 701 to obtain one or more segmentation results of an answer string to be identified;

The above first determination acquisition module 703 is configured to determine whether any of the segmentation results obtained by said segmentation module 702 has the same number of characters as that of the standard answer, and when the determination result is that there is no segmentation result having the same number of characters as that of the standard answer, trigger said output module 706 to output a prompt message that the answer is incorrect; otherwise, trigger said calculation module 704 to calculate identification confidence;

The above first calculation module 741 is configured to calculate identification confidence of the segmentation result having the same number of characters as that of the standard answer, and said second calculation module 742 is configured to calculate the identification confidence of each character in the segmentation result having the same number of characters as that of the standard answer;

The above second determination module 705 is configured to determine whether the answer is correct according to the identification confidence calculated by said calculation module 704, and when it is determined that the answer is correct, trigger said output module 706 to output a prompt message that the answer is correct; when it is determined that the answer is incorrect, trigger said output module 706 to output a prompt message that the answer is incorrect.

Said answer image of a text objective question is an image of an answer character string, and in the embodiments of the present disclosure, said answer character string may be a Chinese character string, an English character string, etc.

One embodiment of the above image acquisition module 701 may comprise the following units:

an image acquisition unit configured to acquire an image of an answer sheet;

an answer region extraction unit configured to, according to the layout information of the answer sheet, segment and extract a target answer region of the answer sheet image;

an answer content extraction unit configured to extract an answer image of a text objective question from the target answer region. Specifically, when the answer region extraction unit obtains the target answer region based on the layout information of the answer sheet and through edge point detection, an answer image can be obtained, and the answer image is an image of the answer character string.

The above image acquisition unit can specifically be an optical mark reader, a high-speed portable scanner, or a mobile terminal device. In other words, an optical mark reader may be used for scanning, or a device, such as a high-speed portable scanner or a mobile terminal, may be used to take photos to acquire an answer sheet image.

One embodiment of the above segmentation module 702 may comprise the following units:

a segmentation unit configured to perform fine segmentation on the answer image to obtain a plurality of fine segmentation sub-blocks;

a confidence calculation unit configured to combine the fine segmentation sub-blocks and calculate combination confidence;

a combination result determination unit configured to determine combination results according to the confidence, and obtain one or more segmentation results of an answer string to be identified. Specifically, if the confidence is greater than a set threshold, it is concluded that said combination is credible, otherwise it is concluded that said combination is not credible. Subsequently, one or more answer character strings to be identified are obtained according to the credible combination results.

It should be noted that one embodiment of the above confidence calculation unit may comprise: a combination subunit, an extraction subunit, and a calculation subunit. Wherever the combination subunit is configured to combine the fine segmentation sub-blocks, there may be a variety of ways to combine fine segmentation sub-blocks (e.g., exhaustive combination), as long as no potential combination result is missed. The extraction subunit is configured to extract a character feature of the character obtained from the combination. The calculation subunit is configured to use a rule-based statistical model obtained from pre-training and the character feature to calculate confidence of said combination.

Said combination confidence represents the accuracy of characters obtained from combination, and specifically, features such as height, width, height/width ratio, inter-character distance, and intra-character distance of the characters after combination can be extracted, a likelihood score can be obtained according to a rule-based statistical model pre-trained by the system, and said score is used as the confidence of a current combination result.

Said rule-based statistical model is a statistical model trained according to the extracted features such as height, width, height/width ratio, inter-character distance, and intra-character distance of the characters after the training data are segmented, and said model may be GMM or SVM.

The calculation of combination confidence is to calculate a likelihood score calculated through the rule-based statistical model with the features extracted from the combination result, namely to combine the scores, and determine the combination confidence according to said score; naturally, said score may be directly used as a corresponding combination confidence.

In addition, it should be noted that, in practice, the system may further comprise a pre-processing module (not shown) disposed between the image acquisition module 701 and the segmentation module 702, and configured to, before the segmentation module 702 segments the answer image, pre-process the answer image to obtain more accurate segmentation results. Said pre-processing may comprise: performing binarization on the answer image, correcting inclined handwriting, thinning handwriting, etc.

The intelligent scoring system for a text objective question provided in the embodiments of the present disclosure performs identification of handwritten character strings for a text objective question with a known standard answer by using the priori information of the answer, thereby achieving automatic scoring of the text objective question, and solving the problem that a conventional automatic scoring system is unable to use computers for fully automatic scoring of text objective questions, while manual scoring causes significant consumption of human resources, high working pressure on teachers and inaccurate scoring results due to subjective factors of teachers.

In FIG. 7, the first calculation module 741 is configured to calculate identification confidence of each segmentation result having the same number of characters as that of the standard answer, and the second calculation module 742 is configured to calculate the identification confidence of each character in each segmentation result having the same number of characters as that of the standard answer. In practice, the system may choose either the first calculation module 741 or the second calculation module 742, or may simultaneously comprise both the first calculation module 741 and the second calculation module 742, which is not limited by the embodiments of the present disclosure. Correspondingly, when the second determination module 705 determines whether the answer is correct, it may determine based on the calculation result from one of the two, or may make a comprehensive determination according to the calculation results from both of the two.

The specific structures of the first calculation module 741 and the second calculation module 742 will be described in detail below through examples.

Figure 8:
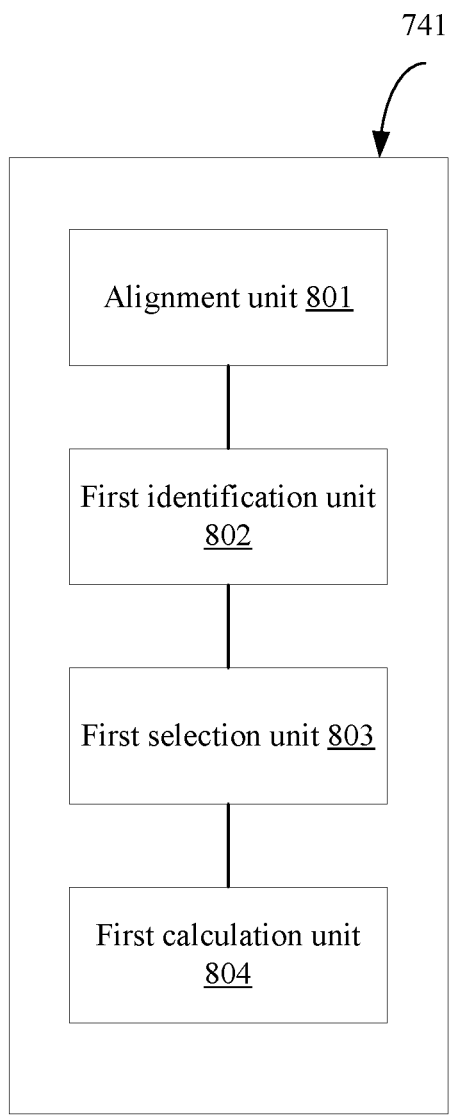
FIG. 8 is a structural block diagram of a first calculation module in an embodiment of the present disclosure.

FIG. 8 is a structural block diagram of a first calculation module in an embodiment of the present disclosure.

In said embodiment, said first calculation module 741 comprises:

an alignment unit 801 configured to align the segmentation result having the same number of characters as that of the standard answer with the text string of the standard answer;

a first identification unit 802 configured to, based on an acoustical model of a complete character set and a general language model, perform handwriting decoding and identification on the segmentation result having the same number of characters as that of the standard answer, to obtain a likelihood score of each identification result;

a first selection unit 803 configured to select a likelihood score of a path with a decoding path consistent with the standard answer in an identification result;

a first calculation unit 804 configured to calculate a posteriori score of said path, and use the posteriori score as the identification confidence of the segmentation result having the same number of characters as that of the standard answer.

Correspondingly, based on the calculation result from the above first calculation module 741, the second determination module 704 in FIG. 7 may determine that the answer is correct if there is any segmentation result having the same number of characters as that of the standard answer having an identification confidence greater than a first confidence threshold; otherwise, determines that the answer is incorrect.

Figure 9:
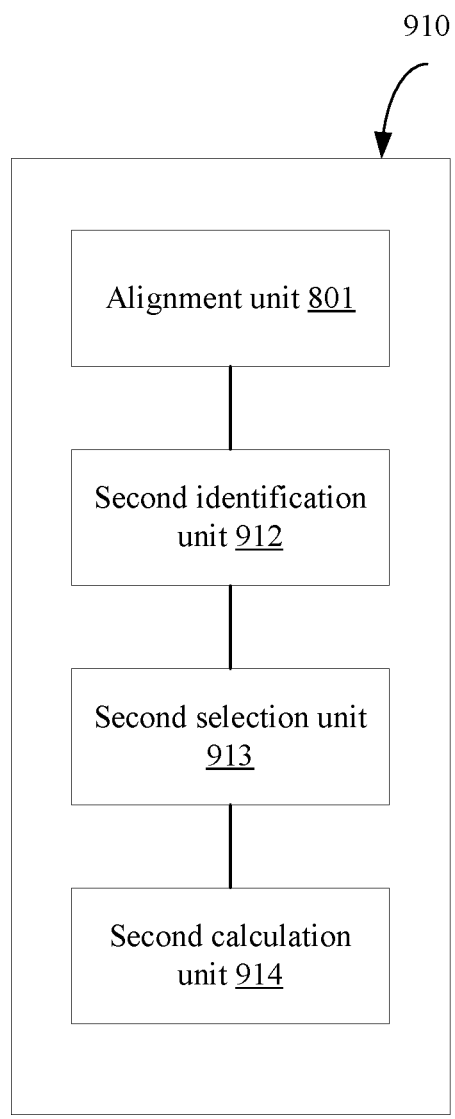
FIG. 9 is a structural block diagram of a second calculation module in an embodiment of the present disclosure.

FIG. 9 is a structural block diagram of a second calculation module in an embodiment of the present disclosure.

In said embodiment, said second calculation module 910 comprises:

an alignment unit 801 configured to align the segmentation result having the same number of characters as that of the standard answer with the text string of the standard answer;

a second identification unit 912 configured to, on the basis of an acoustical model of a complete character set, calculate a likelihood score of the identification result of each character in the segmentation result having the same number of characters as that of the standard answer;

a second selection unit 913 configured to select a likelihood score of the identification result of the character that is consistent with the standard answer in the identification results;

a second calculation unit 914 configured to calculate a posteriori score of the selected identification result, and use the posteriori score as the identification confidence of the character.

Correspondingly, based on the calculation result from the above second calculation module 910, the second determination module 704 in FIG. 7 may determine that the answer is correct if the identification confidence is greater than a second confidence threshold for all characters in any segmentation result having the same number of characters as that of the standard answer; otherwise, determines that the answer is incorrect.

Figure 10:
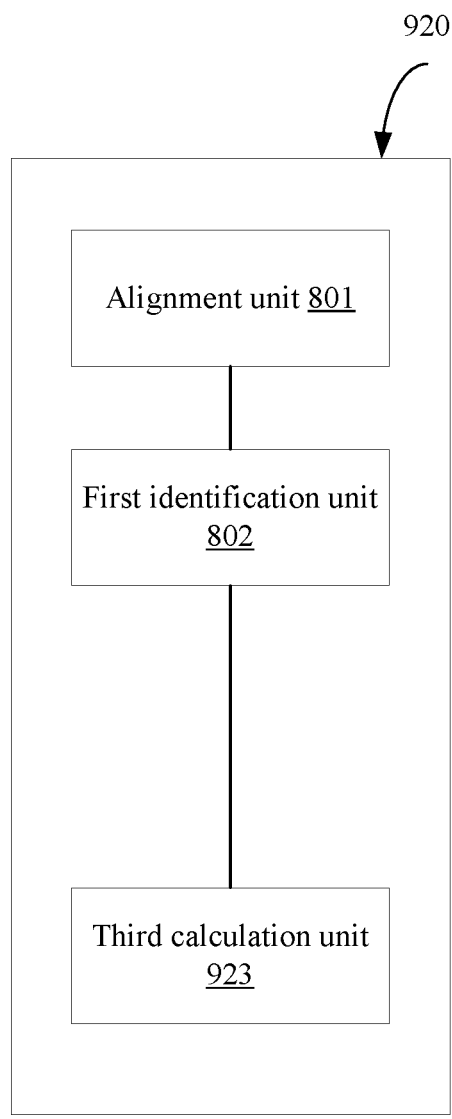
FIG. 10 is another structural block diagram of the second calculation module in an embodiment of the present disclosure.

FIG. 10 is another structural block diagram of the second calculation module in an embodiment of the present disclosure.

In said embodiment, said second calculation module 920 comprises:

the alignment unit 801 configured to align the segmentation result having the same number of characters as that of the standard answer with the text string of the standard answer;

the first identification unit 802 configured to, on the basis of an acoustical model of a complete character set and a general language model, perform handwriting decoding and identification on the segmentation result having the same number of characters as that of the standard answer, to obtain a likelihood score of each identification result;

a third calculation unit 923 configured to calculate a posteriori probability of each identification result, and, according to the posteriori probability of each identification result and for each character in the segmentation result having the same number of characters as that of the standard answer, accumulate the posteriori probability that the identification result of said character in each identification result is consistent with the standard answer, and use the posteriori score as the confidence of the character.

Correspondingly, based on the calculation result from the above second calculation module 920, the second determination module 704 in FIG. 7 may determine that the answer is correct if the identification confidence is greater than a third confidence threshold for all characters in any segmentation result having the same number of characters as that of the standard answer; otherwise, determines that the answer is incorrect.

It should be noted that the first confidence threshold, the second confidence threshold, and the third confidence threshold mentioned above may be identical, or may be different, which is not limited by the embodiments of the present disclosure. In practice, moreover, if the first calculation module and the second calculation module are adopted simultaneously, then whether the answer is correct may be determined by the second determination module 704 depending on whether all determination conditions in these two solutions are satisfied, if they are all satisfied, then it is determined that the answer is correct; otherwise, it is determined that the answer is incorrect.

The embodiments of the present disclosure are described in a progressive manner, the identical or similar parts among the embodiments may be referred to by each other, and each embodiment focuses on the description of different parts from other embodiments. The system embodiments described above are only illustrative, wherein the modules described as separate parts may or may not be physically separate, and the parts shown as units may or may not be physical units, namely they may be located at one place, or may be distributed on a plurality of network units. Some or all of the modules may be selected according to actual need to achieve the objectives of the solutions of the embodiments. Moreover, the functions provided by some of the modules may also be implemented by software, and some modules may be shared with the modules with the same functions in existing devices (e.g. personal computer, tablet computer, and cell phone). A person skilled in the art may understand and implement the above without innovative effort.

The embodiments of the present disclosure are described in detail above, specific implementation modes are used herein to describe the present disclosure, and the description of the above embodiments is just used to help understand the method and the device of the present disclosure; meanwhile, to a person skilled in the art, modifications may be made to the specific implementation modes and application range on the basis of the concept of the present disclosure. In summary, the content of the description shall not be construed as limitations to the present disclosure.

The invention claimed is:

1. A method comprising:
   acquiring, by a processing device, an answer image of a text objective question;
   segmenting, by the processing device, the answer image to obtain one or more segmentation results of an answer string to the text objective question;
   determining, by the processing device, whether any of the segmentation results comprises a same number of characters as that of a standard answer to the text objective question;
   if not, determining, by the processing device, that the answer is incorrect;
   otherwise, based on an acoustical model of a complete character set and a general language model, performing, by the processing device, at least one of handwriting decoding and identification on the segmentation result having the same number of characters as that of the standard answer to obtain an identification confidence or the handwriting decoding and the identification on each character in the segmentation result having the same number of characters as that of the standard answer to obtain the identification confidence; and
   determining, by the processing device, whether the answer is correct according to the identification confidence.

2. The method according to claim 1, wherein said acquiring an answer image of a text objective question comprises:
   acquiring an image of an answer sheet;
   according to the layout information of the answer sheet, segmenting and extracting a target answer region of the answer sheet image; and
   extracting an answer image of a text objective question from the target answer region.

3. The method according to claim 1, wherein said acquiring an image of an answer sheet comprises:
   using at least one of an optical mark reader, a high-speed portable scanner, or a mobile terminal device to acquire an image of an answer sheet.

4. The method according to claim 1, wherein said segmenting the answer image to obtain one or more segmentation results of an answer string to the text objective question comprises:
   performing fine segmentation on the answer image to obtain a plurality of fine segmentation sub-blocks;
   combining the fine segmentation sub-blocks and calculating a combination confidence; and
   determining a combination based on the combination confidence, and obtaining one or more segmentation results of an answer string to the text objective question.

5. The method according to claim 4, wherein said calculating combination confidence comprises:
   extracting a character feature of the character obtained from the combination; and
   using a rule-based statistical model obtained from pre-training and the character feature to calculate confidence of said combination.

6. The method according to claim 1, wherein
   said calculating identification confidence of the segmentation result having the same number of characters as that of the standard answer comprises:
   aligning the segmentation result having the same number of characters as that of the standard answer with the text string of the standard answer;
   based on the acoustical model of the complete character set and the general language model, performing handwriting decoding and identification on the segmentation result having the same number of characters as that of the standard answer, to obtain a likelihood score of each identification result;
   selecting a likelihood score of a path with a decoding path consistent with the standard answer in an identification result; and
   calculating a posteriori score of said path, and using the posteriori score as the identification confidence of the segmentation result having the same number of characters as that of the standard answer, and wherein
   said determining whether the answer is correct according to the calculated identification confidence comprises:
   if there is any segmentation result having the same number of characters as that of the standard answer having an identification confidence greater than a first confidence threshold, determining that the answer is correct; otherwise, determining that the answer is incorrect.

7. The method according to claim 1, wherein
   said calculating identification confidence of each character in the segmentation result having the same number of characters as that of the standard answer comprises:
   aligning the segmentation result having the same number of characters as that of the standard answer with the text string of the standard answer;
   based on the acoustical model of the complete character set and the general language model, performing handwriting decoding and identification on the segmentation result having the same number of characters as that of the standard answer, to obtain a likelihood score of each identification result; and
   calculating a posteriori probability of each identification result, and, based on the posteriori probability of each identification result and for each character in the segmentation result, accumulating the posteriori probability that the identification result of said character in each identification result is consistent with the standard answer, and using the posteriori score as the confidence of the character, and wherein said determining whether the answer is correct according to the calculated identification confidence comprises:
if the identification confidence is greater than a third confidence threshold for all characters in any segmentation result having the same number of characters as that of the standard answer, determining that the answer is correct; otherwise, determining that the answer is incorrect.

8. An intelligent scoring system for a text objective question, comprising:
a memory to store instructions; and
a processing device, communicatively coupled to the memory to:
acquire an answer image of a text objective question;
segment the answer image to obtain one or more segmentation results of an answer string to the text objective question;
determine whether any of the segmentation results comprises a same number of characters as that of a standard answer to the text objective question, and when the determination result is that there is no segmentation result having the same number of characters as that of the standard answer, output a prompt message that the answer is incorrect; otherwise,
based on an acoustical model of a complete character set and a general language model, perform at least one of handwriting decoding and identification on the segmentation result having the same number of characters as that of the standard answer to obtain an identification confidence or, perform the handwriting decoding and the identification on each character in the segmentation result having the same number of characters as that of the standard answer to obtain the identification confidence; and
determine whether the answer is correct based on the identification confidence, and when it is determined that the answer is correct, output a prompt message that the answer is correct; when it is determined that the answer is incorrect, output a prompt message that the answer is incorrect.

9. The system according to claim 8, wherein to acquire the answer image of the next object question, the processing device is further to:
acquire an image of an answer sheet;
according to the layout information of the answer sheet, segment and extract a target answer region of the answer sheet image; and
extract an answer image of a text objective question from the target answer region.

10. The system according to claim 8, wherein the processing device is to use at least one of an optical mark reader, a high-speed portable scanner, or a mobile terminal device to acquire the answer image of the next object question.

11. The system according to claim 8, wherein to segment the answer image, the processing device is further to:
perform fine segmentation on the answer image to obtain a plurality of fine segmentation sub-blocks;
combine the fine segmentation sub-blocks and calculate combination confidence; and
determine a combination according to the confidence, and obtain one or more segmentation results of an answer string to the text objective question.

12. The system according to claim 11, wherein to combine the fine segmentation sub-blocks and calculate the combination confidence, the processing device is further to:
combine the fine segmentation sub-blocks;
extract a character feature of the character obtained from the combination; and
use a rule-based statistical model obtained from pre-training and the character feature to calculate confidence of said combination.

13. The system according to claim 8, wherein to obtain the identification confidence, the processing device is further to:
align the segmentation result having the same number of characters as that of the standard answer with the text string of the standard answer;
based on the acoustical model of the complete character set and the general language model, perform handwriting decoding and identification on the segmentation result having the same number of characters as that of the standard answer, to obtain a likelihood score of each identification result;
select a likelihood score of a path with a decoding path consistent with the standard answer in an identification result; and
calculate a posteriori score of said path, and use the posteriori score as the identification confidence of the segmentation result, and wherein
if there is any segmentation result having the same number of characters as that of the standard answer having an identification confidence greater than a first confidence threshold, the processing device is to determine that the answer is correct; otherwise, determine that the answer is incorrect.

14. The system according to claim 8, wherein to obtain the identification confidence, the processing device is further to:
align the segmentation result having the same number of characters as that of the standard answer with the text string of the standard answer;
based on the acoustical model of the complete character set and the general language model, perform handwriting decoding and identification on the segmentation result having the same number of characters as that of the standard answer, to obtain a likelihood score of each identification result; and
calculate a posteriori probability of each identification result, and, based on the posteriori probability of each identification result and for each character in the segmentation result having the same number of characters as that of the standard answer, accumulate the posteriori probability that the identification result of said character in each identification result is consistent with the standard answer, and use the posteriori score as the confidence of the character, and wherein
if the identification confidence is greater than a third confidence threshold for all characters in any segmentation result having the same number of characters as that of the standard answer, determine that the answer is correct; otherwise, determine that the answer is incorrect.

15. A method comprising:
acquiring, by a processing device, an answer image of a text objective question;
segmenting, by the processing device, the answer image to obtain one or more segmentation results of an answer string to the text objective question;

determining, by the processing device, whether any of the segmentation results comprises a same number of characters as that of a standard answer to the text objective question;

if not, determining, by the processing device, that the answer is incorrect;

otherwise, based on an acoustical model of a complete character set, calculating, by the processing device, the likelihood score of each character in the segmentation result having the same number of characters as that of the standard answer to obtain the identification confidence; and determining, by the processing device, whether the answer is correct according to the identification confidence.

16. The method of claim 15, wherein said calculating identification confidence of each character in the segmentation result having the same number of characters as that of the standard answer comprises:

aligning the segmentation result having the same number of characters as that of the standard answer with the text string of the standard answer;

based on an acoustical model of a complete character set, calculating a likelihood score of the identification result of each character in the segmentation result having the same number of characters as that of the standard answer;

selecting a likelihood score of the identification result of the character that is consistent with the standard answer in the identification results; and calculating a posteriori score of the selected identification result, and using the posteriori score as the identification confidence of the character, and wherein said determining whether the answer is correct according to the calculated identification confidence comprises:

if the identification confidence is greater than a second confidence threshold for all characters in any segmentation result having the same number of characters as that of the standard answer, determining that the answer is correct; otherwise, determining that the answer is incorrect.

\* \* \* \* \*